(12) United States Patent
Ardanese et al.

(10) Patent No.: US 9,140,169 B2
(45) Date of Patent: Sep. 22, 2015

(54) METHOD FOR CONTROLLING REGENERATION WITHIN AN AFTER-TREATMENT COMPONENT OF A COMPRESSION-IGNITION ENGINE

(75) Inventors: Michelangelo Ardanese, Royal Oak, MI (US); Rebecca J Darr, Milford, MI (US); Raffaello Ardanese, Troy, MI (US); Paul Jasinkiewicz, Northville, MI (US); Min Sun, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 112 days.

(21) Appl. No.: 13/298,470

(22) Filed: Nov. 17, 2011

(65) Prior Publication Data
US 2013/0125529 A1    May 23, 2013

(51) Int. Cl.
*F01N 3/00* (2006.01)
*F01N 9/00* (2006.01)
*F02D 41/02* (2006.01)
(Continued)

(52) U.S. Cl.
CPC .............. *F01N 9/002* (2013.01); *F01N 3/027* (2013.01); *F01N 9/007* (2013.01); *F01N 11/002* (2013.01); *F02D 41/029* (2013.01); *F01N 2900/08* (2013.01); *F01N 2900/1606* (2013.01); *F02D 41/1445* (2013.01); *F02D 41/1448* (2013.01);
(Continued)

(58) Field of Classification Search
CPC ....... F01N 11/00; F01N 11/002; F01N 9/002; F01N 9/005; F01N 9/007; F01N 2550/04; F01N 2900/0601; F01N 2900/1606; F01N 2900/08; F01N 3/027; F02D 41/029; F02D 41/1445; F02D 41/1448

USPC .................... 60/272–324; 73/23.33
See application file for complete search history.

(56) References Cited

U.S. PATENT DOCUMENTS 6,622,480 B2 *  9/2003  Tashiro et al. .................. 60/295
7,631,491 B2 * 12/2009  Lange ............................. 60/295
(Continued)

FOREIGN PATENT DOCUMENTS

CN    101598058 A    12/2009
CN    102191972 A     9/2011

OTHER PUBLICATIONS

Chinese Office Action for Application No. 201210462767.7 dated Jun. 20, 2014; 5 pages.

*Primary Examiner* — Thomas Denion
*Assistant Examiner* — Kelsey Stanek
(74) *Attorney, Agent, or Firm* — Cantor Colburn LLP

(57) ABSTRACT

A method for controlling regeneration within an after-treatment component of a compression-ignition engine comprises calculating an initial estimate of accumulated particulate matter based on a pressure-based soot accumulation model and a pressure drop index indicative of a decrease in pressure across the component. An adjusted estimate of accumulated particulate matter in the component is calculated based on the initial estimate and a soot prediction error inherent in the soot model. The adjusted estimate is compared to a predetermined threshold associated with the after-treatment component, and a remedial action is initiated when the adjusted estimate of accumulated particulate matter in the after-treatment component exceeds the predetermined threshold. The pressure-based soot accumulation model may be configured to predict soot accumulation in the absence of passive regeneration, and an adjusted kinetic burn model may be used to estimate a quantity of soot disposed through passive regeneration.

18 Claims, 2 Drawing Sheets

(51) Int. Cl.
  *F01N 11/00* (2006.01)
  *F01N 3/027* (2006.01)
  *F02D 41/14* (2006.01)

(52) U.S. Cl.
  CPC . *F02D 2041/1433* (2013.01); *F02D 2200/0812* (2013.01); *Y02T 10/47* (2013.01)

(56) References Cited

U.S. PATENT DOCUMENTS

| | | | |
|---|---|---|---|
| 7,784,272 B2 | 8/2010 | Song et al. |
| 7,832,200 B2 | 11/2010 | Kesse et al. |
| 7,841,172 B2 | 11/2010 | Scaife et al. |
| 7,895,827 B2 | 3/2011 | Wang et al. |
| 7,900,614 B2 | 3/2011 | Ding |
| 7,902,107 B2 | 3/2011 | Patchett et al. |
| 7,918,086 B2 | 4/2011 | Surnilla et al. |
| 7,926,263 B2 | 4/2011 | Stroh et al. |
| 7,946,161 B2 | 5/2011 | Wills |
| 7,964,154 B2 | 6/2011 | Makkee et al. |
| 8,001,769 B2 | 8/2011 | Wei et al. |
| 8,011,179 B2 | 9/2011 | Scaife et al. |
| 8,011,180 B2 | 9/2011 | Brahma et al. |
| 8,015,805 B2 | 9/2011 | Pfaeffle et al. |
| 8,024,108 B2 | 9/2011 | Hacker |
| 8,046,644 B2 | 10/2011 | Lin |
| 8,051,645 B2 * | 11/2011 | Chamarthi et al. ............. 60/295 |
| 8,484,956 B2 | 7/2013 | Mastbergen |
| 2005/0022520 A1 * | 2/2005 | Shirakawa et al. ............. 60/297 |
| 2011/0153179 A1 * | 6/2011 | Guglielmone et al. ....... 701/102 |
| 2011/0197567 A1 * | 8/2011 | Mastbergen .................... 60/276 |
| 2011/0209460 A1 * | 9/2011 | He et al. .......................... 60/274 |
| 2012/0090294 A1 * | 4/2012 | Sujan et al. ..................... 60/274 |
| 2012/0174652 A1 * | 7/2012 | Jasinkiewicz et al. ....... 73/23.33 |
| 2013/0276445 A1 * | 10/2013 | Chen et al. ................... 60/605.1 |

* cited by examiner

METHOD FOR CONTROLLING REGENERATION WITHIN AN AFTER-TREATMENT COMPONENT OF A COMPRESSION-IGNITION ENGINE

FIELD OF THE INVENTION

The subject invention relates to after-treatment systems for compression-ignition engines and more particularly to a method for controlling regeneration within an after-treatment component of a compression-ignition engine.

BACKGROUND

The emission of particulate matter in exhaust from compression-ignition engines is regulated for environmental reasons. Thus, vehicles equipped with compression-ignition engines often include after-treatment components such as particulate filters, catalyzed soot filters and adsorption catalysts for removing particulate matter and other regulated constituents (e.g., nitrogen oxides or NOx) from their exhaust streams. Particulate filters and other after-treatment components can be effective, but can also increase back pressure as they collect particulate matter.

Particulate matter may include ash and unburned carbon particles generally referred to as soot. As this carbon-based particulate matter accumulates in the after-treatment components, it can increase back pressure in the exhaust system. Engines that have large rates of particulate mass emission can develop excessive back pressure levels in a relatively short period of time, decreasing engine efficiency and power producing capacity. Therefore, it is desired to have particulate filtration systems that minimize back-pressure while effectively capturing particulate matter in the exhaust.

To accomplish both of these competing goals, after-treatment components must be regularly monitored and maintained either by replacing components or by removing the accumulated soot. Cleaning the accumulated soot from an after-treatment component can be achieved via oxidation to $CO_2$ (i.e., burning-off) and is known in the art as regeneration. To avoid service interruptions, regeneration is generally preferred over replacement of after-treatment components.

One way that regeneration may be accomplished is by increasing the temperature of the filter material, and the collected particulate matter, to a level above the combustion temperature of the particulate matter. Elevating the temperature facilitates consumption of the soot by allowing the excess oxygen in the exhaust gas to oxidize the particulate matter. Particulate matter may also be oxidized, and thus removed, at lower temperatures by exposing the particulate matter to sufficient concentrations of nitrogen dioxide ($NO_2$). Exhaust from a compression-engine, such as a diesel engine, typically contains NOx, which consists primarily of nitric oxide (NO) and approximately 5 to 20 percent $NO_2$, with greater levels of $NO_2$ being common where oxidation catalysts are present in the exhaust stream. Thus, some level of regeneration occurs even at a relatively low temperature.

The regeneration process can be either passive or active. In a passive system, regeneration occurs whenever heat (e.g., carried by the exhaust gasses) and soot (e.g., trapped in the after-treatment components) are sufficient to facilitate oxidation, and/or whenever sufficient concentrations of $NO_2$ are present in the exhaust to enable oxidation at lower temperature. In an active system, regeneration is induced at desired times by introducing heat from an outside source (e.g., an electrical heater, a fuel burner, a microwave heater, and/or from the engine itself, such as with a late in-cylinder injection or injection of fuel directly into the exhaust stream). Active regeneration can be initiated during various vehicle operations and exhaust conditions. Among these favorable operating conditions are stationary vehicle operations such as when the vehicle is at rest, for example, during a refueling stop. Engine control systems can be used to predict when it may be advantageous to actively facilitate a regeneration event and to effectuate control over the regeneration process.

Accordingly, it is desirable to provide an improved system and method for determining when to facilitate active regeneration and for controlling active regeneration of particulate filtration systems.

SUMMARY OF THE INVENTION

In one exemplary embodiment of the invention, a method for controlling regeneration within an after-treatment component of a compression-ignition engine comprises calculating an initial estimate of accumulated particulate matter in the after-treatment component based on a pressure-based soot accumulation model, a pressure drop index indicative of a decrease in pressure of an exhaust stream as it passes through the after-treatment component, and a flow rate index indicative of a rate of flow of the exhaust stream. An adjusted estimate of accumulated particulate matter in the after-treatment component is calculated based on the initial estimate of accumulated particulate matter in the after-treatment component and a soot prediction error inherent in the soot model. The adjusted estimate is compared to a predetermined threshold associated with the after-treatment component, and a remedial action is initiated when the adjusted estimate of accumulated particulate matter in the after-treatment component exceeds the predetermined threshold.

In another exemplary embodiment of the invention, the pressure-based soot accumulation model is configured to predict soot accumulation in the absence of passive regeneration.

In yet another exemplary embodiment of the invention, an adjusted kinetic burn model estimates a quantity of soot disposed through passive regeneration.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
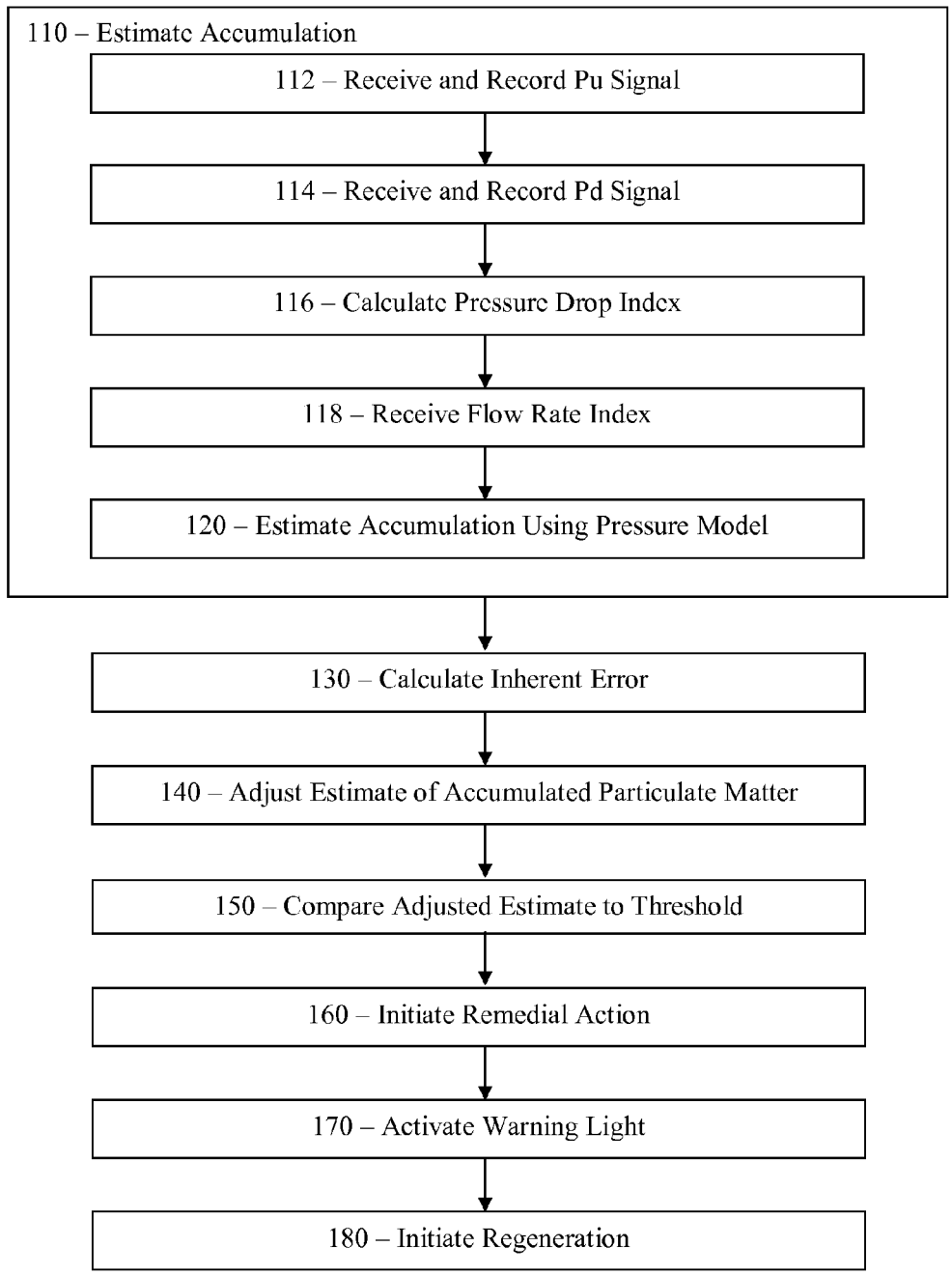
FIG. 1 is a process flow diagram showing an exemplary process for controlling regeneration within an after-treatment component of a compression-ignition engine.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, as shown in FIG. 1, a process 100 for controlling regeneration within an after-treatment component of a compression-ignition engine, such as a particulate filter, generally includes the step of calculating an initial estimate of particulate matter accumulation in the after-treatment component (step 110). This step begins with the calculation or receipt of a pressure drop index indicative of a decrease in pressure of an exhaust stream as it passes through the after-treatment component. In an exemplary embodiment, a signal indicative of pressure upstream (Pu) of the after-treatment component is received and recorded (step 112), and a signal indicative of pressure downstream (Pd) from the after-treatment component is also received and recorded (step 114).

Once these pressure signals have been recorded, a pressure drop index may be calculated (step 116) that is indicative of the level of pressure decrease experienced by the exhaust stream as it passes through the after-treatment component at the different exhaust flow rate. In one embodiment, the pressure drop index is calculated as a ratio of upstream to downstream pressure (i.e., PR=Pu/Pd) so as to represent a pressure ratio across the after-treatment component. In another embodiment, the pressure drop index is calculated as a difference between the upstream and downstream pressures (i.e., DP=Pu−Pd) so as to represent a difference in pressure across the after-treatment component. In still another embodiment, the pressure drop index is calculated as the difference between the upstream and downstream pressures divided by the magnitude of the upstream pressure (i.e., as a normalized pressure drop, DPP=DP/Pu) so as to represent a normalized difference in pressure across the after-treatment component.

In addition to determining the pressure drop index associated with the after-treatment component, an exemplary process also includes the receiving a flow rate index that is indicative of a relative flow rate of the exhaust stream (step 118). The flow rate index signal can be produced by an engine speed sensor or a mass airflow sensor or any other sensor configured to sense an engine operating condition that is indicative of the relative flow rate of the exhaust stream.

Once the pressure drop index and the flow index of the exhaust stream have been determined, an exemplary process employs a pressure-based soot accumulation model (step 120) to calculate an initial estimate of accumulated particulate matter in the after-treatment component based on the pressure drop index and the flow rate index. This initial estimate represents the amount of particulate matter that is predicted to have accumulated in the after-treatment component. The pressure-based soot accumulation model, which may be based on empirical data, is configured to reflect the relationship between the amount of particulate matter that has accumulated in the after-treatment component, the pressure drop index, and the flow index. This model is typically calibrated to accurately predict particulate matter accumulation at cold temperatures in the absence of appreciable passive regeneration (e.g., with exhaust temperature lower than 230 C). Accordingly, the soot model is correlated to the particular form of pressure drop index chosen for the system, which may be a ratio of upstream and downstream pressures, a difference between the upstream and downstream pressures, or a normalized difference between the upstream and downstream pressures.

Since the soot accumulation model is calibrated to accurately predict particulate matter accumulation in the absence of passive regeneration (i.e., at relatively cool temperatures), in situations where passive regeneration is likely to occur (i.e., at exhaust temperatures greater than approximately 200 C, in the presence of NOx), the soot accumulation model will likely predict levels of particulate matter accumulation that are different from the actual particulate matter accumulation remaining in the after-treatment component. As an after-treatment component accumulates particulate matter, the pressure drop index will reflect that accumulation—at least initially. As passive regeneration occurs, however, and as particulate matter accumulates in the after-treatment component, carbon particles contained within the accumulated particulate matter will be oxidized through reaction with NO2. This process can cause the distribution of particles and, consequently, the flow characteristics within the after-treatment component to change. As a result, the differential pressure response may not be able to distinguish between a mere change in soot distribution and an actual change in soot mass due to soot burn. Therefore, unless the effects of passive regeneration on soot mass reduction are considered and accounted, the soot model will fail to accurately predict particulate matter accumulation and may fail to accurately determine when to facilitate active regeneration or to properly inform an operator to seek replacement of a particulate filter or to properly control active regeneration in after-treatment system components or may otherwise endanger after-treatment hardware.

To at least partially remedy these shortcomings, process 100 for controlling regeneration within an after-treatment component includes the further step of calculating (step 130) a soot prediction error that is inherent in the soot model due to its failure to account for passive regeneration. This error could be assessed empirically as the difference between direct measurement of soot mass (e.g., via changes in weight of the after-treatment component) and outputs from a soot model (e.g., based on a differential pressure signal). To compensate for the soot prediction error, an adjusted kinetic burn model estimates a quantity of particulate matter disposed through passive regeneration (i.e., a real-time soot burn rate associated with reaction of soot with NO2 present in the exhaust stream). In an exemplary embodiment, an adjusted kinetic burn model is configured to account for the effects of heat released by regeneration in the after-treatment component. The kinetic burn model is also configured to account for the effects of NOx storage and/or release in the after-treatment component. The kinetic burn model may also be configured to account for the effects of sulfation and/or desulfation and from the formation of alternate reductants in the after-treatment components. The kinetic burn model may also be adjusted based on data measured using the engine and the after-treatment component. Accordingly, the kinetic burn model simulates exhaust flow through the after-treatment component and heat exchanged among the catalyst substrate, the soot layer, and the environment. The kinetic burn model also simulates chemical reactions in the after-treatment components and predicts after-treatment performance over a range of operating conditions. Inputs to the adjusted kinetic burn model include soot rate at the inlet to the after-treatment component (e.g., as provided by a soot model based on differential pressure, based on estimated soot rates corrected by exhaust sensors and engine parameters or one or more other appropriate indices), exhaust gas temperature, temperature and flow rate, engine speed, fuel flow rate, pressure upstream of the DPF, HC and Oxygen flow at inlet of the DPF, and NOx level. As a result, use of the kinetic burn model, together with a soot loading model, enables the level of particulate matter that is accumulated in the after-treatment component and oxidized via passive regeneration to be more reliably estimated.

Based on the real-time estimate of accumulated particulate matter in the after-treatment component determined using the soot model and the expected soot prediction error (e.g., based on the amount of soot burned during passive regeneration, and with the prediction error having been determined empirically), an adjusted estimate of accumulated particulate matter in the after-treatment component is calculated (step 140). This adjusted estimate is calculated as the sum of the estimate of accumulated particulate matter in the after-treatment component determined using the soot model and the soot prediction error expected (i.e., level of particulate matter under-prediction that is inherent in the soot model as estimated by the kinetic burn model). It should be appreciated that this real-time correlation of the model estimation (based on differential pressure) depends upon the amount of soot burned as estimated by the kinetic model. Since the kinetic model has been adjusted (e.g., based on empirical data), the kinetic model produces a reliable prediction of the amount of soot burned.

Once the adjusted prediction of accumulated particulate matter is complete, the adjusted estimate of accumulated particulate matter in the after-treatment component is compared (step 150) to a predetermined threshold associated with the after-treatment component. If the results indicate that the adjusted estimate of accumulated particulate matter in the after-treatment component exceeds the predetermined threshold, the control may initiate a remedial action such as initiating one or more adjustments to one or more engine control parameters so as to modify operation of the engine to promote passive regeneration in the after-treatment component (step 160). This may be accomplished by configuring the one or more adjustments to provide a minimum temperature at the after-treatment component promoting active regeneration in the after-treatment component. The minimum temperature may be achieved by modifying fueling and timing of the engine or by activating an auxiliary heating element to increase a temperature of the exhaust stream.

Alternatively to, or in conjunction with, the engine operating modifications, the control may activate a warning light instructing the operator to initiate a filter regeneration cycle (step 170). A manual switch for initiating regeneration may be provided to enable the operator to respond to the activation of the warning light, at a time of the operator's choosing, by actuating the switch and thereby initiating regeneration step 180).

Figure 2:
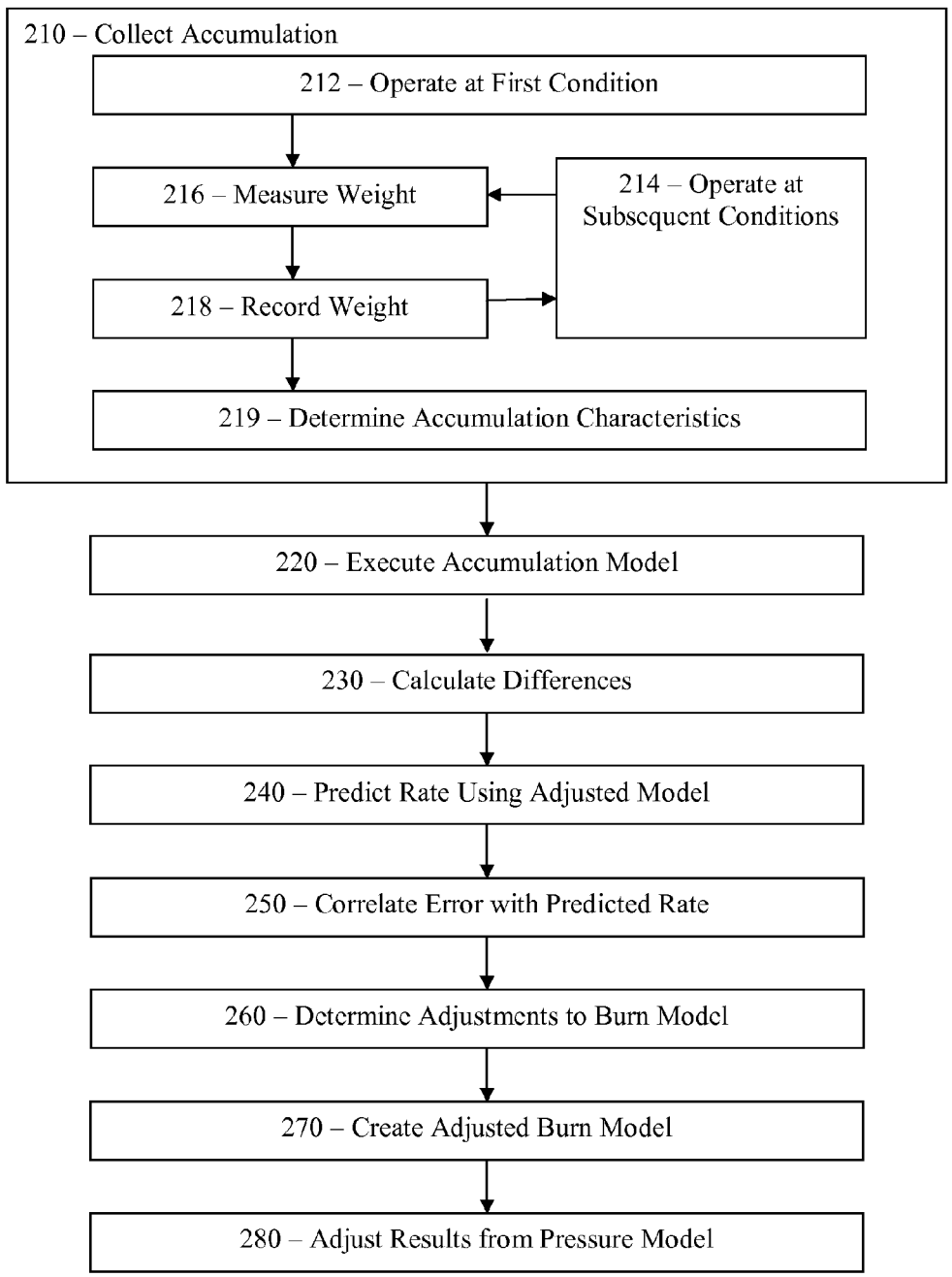
FIG. 2 is a process flow diagram showing an exemplary process for developing an adjusted kinetic burn model.

As shown in FIG. 2, in an exemplary embodiment, a process 200 for developing an adjusted kinetic burn model, such as the model used in step 140 above, includes the step of collecting (step 210) particulate matter accumulation data across matrix of after-treatment conditions. Accordingly, particulate matter accumulation data is gathered under a range of conditions in which passive regeneration occurs at varying levels of intensity. As particulate matter accumulates at a particular operating condition, weight of each after-treatment component, such as the particulate filter, is measured (step 216) and recorded (step 218) over a period of time as the particulate matter loads within the component. The change in weight of the component is indicative of the weight of particulate matter accumulated in the after-treatment component.

More specifically, in an exemplary embodiment, a first engine is operated (step 212) at a first testing condition characterized by a first ambient pressure and temperature, a first engine operating speed, and a first engine load. At regular time intervals, the weight of particulate matter accumulated in an after-treatment component is measured (step 216) and recorded (steps 218) until a relevant loading time has elapsed. Next, a subsequent testing condition is set (step 214) as characterized by a subsequent combination of ambient pressure and temperature and engine operating speed and load. Again, at regular time intervals, the weight of particulate matter accumulated in an after-treatment component is measured (step 216) and recorded (step 218) until a relevant loading time has elapsed. Additional testing conditions may be set (step 214), and data sets may be measured (step 216) and recorded (step 218) until the particulate matter accumulation characteristics for the engine have been determined at a range of desired testing conditions (step 219) and, thus, particulate matter accumulation data has been gathered across a range of after-treatment conditions, thereby enabling the varying levels of intensity at which passive regeneration occurs to be characterized. As those skilled in the art will appreciate, the number of weights per loading should be based upon the various levels at which model accuracy is desired. Conditions of particular interest may include those triggering regeneration. The relevant loading time may be a length of time necessary to experience limitations on engine power resulting from particulate matter accumulation.

A process 200 for developing an adjusted kinetic burn model also includes the step of executing (step 220) a pressure-based soot accumulation model, such as the model described in step 120 above, at each of the testing conditions used in steps 212 and 214 described above. By executing the pressure-based soot accumulation model at each of the testing matrix conditions, particulate matter accumulation can be predicted in the absence of passive regeneration.

A process 200 for developing an adjusted kinetic burn model also includes the step of calculating (step 230) differences between data collected in step 210 and the predictions generated in step 220 using the soot model. These differences represent the actual under- or over-prediction of particulate matter levels (i.e., particulate matter under- or over-predictions). Since the under-prediction can be associated with the failure to account for the soot burn rate associated with regeneration, the kinetic model is used to correct for under-prediction by the differential pressure-based model.

Next, a soot burn rate is predicted (step 240) using an adjusted kinetic burn model executed at each of the testing conditions used in steps 212 and 214 described above. The adjusted kinetic burn model simulates the phenomenon of passive regeneration and is therefore capable of predicting, with reasonable accuracy, in real-time, soot oxidized by NO2. The kinetic burn model simulates the passive regeneration occurring at each of the matrix conditions, estimating, in real-time, the rate of soot burn and heat production associated with the NO2 reaction. Accordingly the kinetic based burn model produces an estimate of the level of under- or over-prediction as a real-time soot burn rate associated with NO2 reaction. Next, a process 200 for developing a soot model (e.g., that is based on differential pressure and accounts for model inaccuracies associated with passive regeneration) also includes the step of correlating the error measured (step 250) with the soot rate estimated via the kinetic model. A resulting model based on differential pressure should, therefore, be capable of predicting soot in the absence of passive regeneration. A kinetic model should be capable of accurately simulating soot burn associated with passive regeneration. A combined soot model comprising the model based on differential pressure and the kinetic model can be created so as to produce reliable predictions whether passive or non-passive regeneration is occurring. Such a combined soot model couples the model based on differential pressure with the kinetic model by establishing a correlation (e.g., via empirical data) between the inaccuracies that are inherent in the model based on differential pressure and soot burn rates as predicted using the kinetic model.

Accordingly, a process 200 for developing an adjusted kinetic burn model also includes the step of determining (step 260) adjustments that are sufficient to adjust the kinetic burn model so that the model predicts, with reasonable accuracy, actual under- or over-prediction of particulate matter levels (i.e., particulate matter under-predictions) associated with the failure to account for soot burn rate associated regeneration. The adjustments are applied (step 270) to the kinetic burn model, thereby creating an adjusted kinetic burn model.

Thus, the adjusted kinetic burn model can accurately predict a real-time soot burn rate associated with the NO2 reaction. This soot burn rate can be used to adjust (step 280) results produced by the pressure-based soot accumulation model to produce accurate predictions for soot accumulation in an after-treatment component. These predictions can be used to accurately determine when it may be advantageous to actively facilitate a regeneration event or to effectuate control over the regeneration process such as by adding heat to a regeneration component or to notify an operator that it may be necessary to replace a regeneration component. In essence, an accurate, real-time soot correction can be used to compensate for inaccuracies inherent in pressure-based soot accumulation models. This real-time soot correction is based on estimated real-time soot burn rates associated with NOx reactions, as calculated by a kinetic based burn model that is correlated to empirical data. As a result, hardware protection can be improved and engine efficiency can be maintained.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method for controlling regeneration within an after-treatment component of a compression-ignition engine, comprising:
   receiving a pressure drop index indicative of a decrease in pressure of an exhaust stream as it passes through the after-treatment component;
   receiving a flow rate index indicative of a rate of flow of the exhaust stream;
   calculating an initial estimate of accumulated particulate matter in the after-treatment component based on a pressure-based soot accumulation model, the pressure drop index, and the flow rate index;
   calculating a soot prediction error inherent in the soot model;
   calculating an adjusted estimate of accumulated particulate matter in the after-treatment component based on the initial estimate of accumulated particulate matter in the after-treatment component and the soot prediction error;
   comparing the adjusted estimate of accumulated particulate matter in the after-treatment component to a predetermined threshold associated with the after-treatment component; and
   initiating a remedial action when the adjusted estimate of accumulated particulate matter in the after-treatment component exceeds the predetermined threshold, wherein the remedial action comprises initiating one or more adjustments to one or more engine control parameters so as to modify operation of the engine to promote passive regeneration in the after-treatment component;
   wherein the step of calculating a soot prediction error comprises executing an adjusted kinetic burn model to estimate a quantity of soot disposed through passive regeneration, wherein the adjusted kinetic burn model is develop by:
      gathering particulate matter accumulation data under a range of conditions in which passive regeneration occurs at varying levels of intensity by measuring a weight of the after-treatment component at a plurality of particular operating conditions under the range of conditions;
      executing the pressure-based soot accumulation model at the plurality of particular operating conditions to predict particulate matter accumulation data in the after-treatment component;
      calculating a difference between the gathered particulate matter accumulation data and the predicted particulate matter accumulation data;
      predicting a soot burn rate utilizing a kinetic model to simulate passive regeneration and predict an amount of soot oxidized by NO2;
      correlating the calculated difference with the soot burn rate predicted with the kinetic model;
      determining adjustments to adjust the kinetic model such that the kinetic model predicts under-production or over-production of particulate matter levels in the after-treatment component associated with a failure to account for a soot burn rate associated with passive regeneration; and
      applying the adjustments to the kinetic model to develop the adjusted kinetic burn model; and
   wherein the kinetic burn model is configured to account for the effects of heat released by passive regeneration in the after-treatment component.

2. The method of claim 1, wherein the pressure drop index represents a pressure ratio across the after-treatment component.

3. The method of claim 1, wherein the pressure drop index represents a difference in pressure across the after-treatment component.

4. The method of claim 1, wherein the pressure drop index represents a normalized difference in pressure across the after-treatment component.

5. The method of claim 1, wherein the flow rate index is based on a speed of the engine.

6. The method of claim 1, wherein the flow rate index is based on a mass airflow rate of the engine.

7. The method of claim 1, wherein the pressure-based soot accumulation model is based on empirical data.

8. The method of claim 1, wherein the pressure-based soot accumulation model is configured to predict particulate matter accumulation in the absence of passive regeneration.

9. The method of claim 1, wherein the kinetic burn model is adjusted to approximate data measured using the engine and the after-treatment component.

10. The method of claim 1, wherein the adjusted kinetic burn model is configured to account for the effects of NOx storage or release in the after-treatment components.

11. The method of claim 1, wherein the adjusted kinetic burn model is configured to account for the effects of sulfation or desulfation in the after-treatment component.

12. The method of claim 1, wherein the adjusted kinetic burn model is configured to account for the formation of alternate reductants in the after-treatment component.

13. The method of claim 1, wherein the one or more adjustments are configured to provide a minimum temperature at the after-treatment component promoting passive regeneration in the after-treatment component.

14. The method of claim 1, wherein the one or more adjustments comprise modifying fueling and timing of the engine.

15. The method of claim 1, wherein the one or more adjustments comprise activating an auxiliary heating element to increase a temperature of the exhaust stream.

16. The method of claim 1, wherein the remedial action comprises activating a warning light instructing the operator to initiate regeneration in the after-treatment component.

17. The method of claim 1, further comprising actuating a switch to initiate regeneration in the after-treatment component.

18. A method for controlling regeneration within an after-treatment component of a compression-ignition engine, the method comprising:
   predicting a soot accumulation in the after-treatment component using a pressure based soot accumulation model;
   developing an adjusted kinetic burn model based on a kinetic model;
   predicting a soot burn rate in the after-treatment component associated with NO2 using the developed adjusted kinetic burn model;
   adjusting the predicted soot accumulation with the soot burn rate predicted with the adjusted kinetic burn model to predict a corrected soot accumulation in the after-treatment component;
   comparing the corrected soot accumulation to a predetermined threshold; and
   adjusting at least one engine control parameter to promote passive regeneration in the after-treatment component if the corrected soot accumulation exceeds the predetermined threshold;
   wherein the adjusted kinetic burn model is developed by:
      gathering particulate matter accumulation data under a range of conditions in which passive regeneration occurs a varying levels of intensity by measuring a weight of the after-treatment component at a plurality of particular operating conditions under the range of conditions;
      executing the pressure-based soot accumulation model at the plurality of particular operating conditions to predict particulate matter accumulation data in the after-treatment component;
      calculating a difference between the gathered particulate matter accumulation data and the predicted particulate matter accumulation data;
      predicting a soot burn rate with the kinetic model to simulate passive regeneration and predict an amount of soot oxidized by NO2;
      correlating the calculated difference with the soot burn rate predicted with the kinetic model;
      determining adjustments to adjust the kinetic model such that the kinetic model predicts under-production or over-production of particulate matter levels in the after-treatment component associated with a failure to account for a soot burn rate associated with passive regeneration; and
      applying the adjustments to the kinetic model to develop the adjusted kinetic burn model.

* * * * *